United States Patent
Hoshiba et al.

(10) Patent No.: US 12,214,565 B2
(45) Date of Patent: Feb. 4, 2025

(54) PNEUMATIC TIRE AND METHOD OF MANUFACTURING THE SAME

(71) Applicant: The Yokohama Rubber Co., LTD., Tokyo (JP)

(72) Inventors: Takashi Hoshiba, Hiratsuka (JP); Masahiro Naruse, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 611 days.

(21) Appl. No.: 16/484,810

(22) PCT Filed: Nov. 14, 2017

(86) PCT No.: PCT/JP2017/040960
§ 371 (c)(1),
(2) Date: Aug. 8, 2019

(87) PCT Pub. No.: WO2018/146885
PCT Pub. Date: Aug. 16, 2018

(65) Prior Publication Data
US 2020/0023599 A1    Jan. 23, 2020

(30) Foreign Application Priority Data
Feb. 8, 2017 (JP) .................. 2017-021294

(51) Int. Cl.
*B29D 30/06* (2006.01)
*B29C 33/58* (2006.01)
*B60C 19/00* (2006.01)

(52) U.S. Cl.
CPC .......... *B29D 30/0681* (2013.01); *B29C 33/58* (2013.01); *B60C 19/002* (2013.01)

(58) Field of Classification Search
CPC ..... B60C 19/002; B60C 19/12; B60C 19/122; B60C 19/125
USPC .......................................... 152/450
See application file for complete search history.

(56) References Cited

U.S. PATENT DOCUMENTS

| | | | |
|---|---|---|---|
| 4,863,650 A * | 9/1989 | Kohler | B29C 33/64 264/39 |
| 2005/0098251 A1 | 5/2005 | Yukawa | |
| 2006/0231185 A1 | 10/2006 | Tanno et al. | |

(Continued)

FOREIGN PATENT DOCUMENTS

| | | |
|---|---|---|
| JP | 2005-138760 | 6/2005 |
| JP | 2005-262920 A | 9/2005 |

(Continued)

OTHER PUBLICATIONS

Naoki Yugawa, JP-2008044574-A., machine translation. (Year: 2008).*

(Continued)

*Primary Examiner* — Sedef E Paquette
(74) *Attorney, Agent, or Firm* — Thorpe North & Western

(57) ABSTRACT

A pneumatic tire that is vulcanized using a bladder provided with a coating layer formed by a release agent, a noise absorber 6 being fixed on an inner surface of a tread portion 1 along a tire circumferential direction via an adhesive layer 7, and a thickness of the release agent detected by an electron microscope is 0.1 μm to 100 μm at least in a fixation region for the noise absorber 6.

19 Claims, 2 Drawing Sheets

(56) References Cited

U.S. PATENT DOCUMENTS

| | | | |
|---|---|---|---|
| 2007/0089824 A1* | 4/2007 | Yukawa | B60C 19/002 |
| | | | 152/450 |
| 2007/0131328 A1* | 6/2007 | Yukawa | B60C 19/002 |
| | | | 152/450 |
| 2009/0038726 A1* | 2/2009 | Yukawa | B60C 19/002 |
| | | | 152/454 |
| 2011/0056612 A1* | 3/2011 | Sugimoto | C08L 53/00 |
| | | | 156/110.1 |
| 2013/0032262 A1 | 2/2013 | Bormann et al. | |
| 2015/0042001 A1* | 2/2015 | Dubos | B29D 30/0654 |
| | | | 425/103 |
| 2016/0297261 A1* | 10/2016 | Tanno | B60C 13/00 |
| 2016/0303923 A1 | 10/2016 | Tanno et al. | |
| 2018/0133934 A1* | 5/2018 | Balnis | B60C 1/0008 |
| 2019/0382517 A1* | 12/2019 | Zhou | C08F 212/08 |

FOREIGN PATENT DOCUMENTS

| | | | | |
|---|---|---|---|---|
| JP | 2005271695 A | * | 10/2005 | B60C 19/002 |
| JP | 2008-044574 | | 2/2008 | |
| JP | 4281874 | | 6/2009 | |
| JP | 4410753 | | 2/2010 | |
| JP | 2010-046907 | | 3/2010 | |
| JP | 2013-032009 | | 2/2013 | |
| JP | 2015-107690 | | 6/2015 | |
| JP | 2015-128893 | | 7/2015 | |
| WO | WO 2005/012007 | | 2/2005 | |
| WO | WO-2015076382 A1 | * | 5/2015 | B32B 5/18 |
| WO | WO 2015/083727 | | 6/2015 | |

OTHER PUBLICATIONS

Naoki Yugawa, JP-2005138760-A, updated machine translation. (Year: 2005).*

Atsushi Tanno, JP-2015107690-A, updated machine translation. (Year: 2015).*

Tanno A, JP-2005271695-A, machine translation. (Year: 2005).*

International Search Report for International Application No. PCT/JP2017/040960 dated Feb. 13, 2018, 4 pages, Japan.

* cited by examiner

PNEUMATIC TIRE AND METHOD OF MANUFACTURING THE SAME

TECHNICAL FIELD

The present technology relates to a pneumatic tire and a method for manufacturing the same. More specifically, the present technology relates to a pneumatic tire that enables both air retention and adhesion of a noise absorber to be achieved without compromising tire productivity by affixing the noise absorber to the tire inner surface with a release agent adhered thereto, and a method for manufacturing the same.

BACKGROUND ART

Cavernous resonance caused by the vibration of the air in the cavity of the tire is one cause of tire noise. This cavernous resonance occurs when the air in the tire cavity portion is vibrated by the vibrations of a tread portion of a tire that contacts a road surface due to unevenness of the road surface on which a vehicle is being driven. Actually, the cavernous resonance includes a frequency band resulting in noise, and thus it is important to reduce the level of noise in the frequency band from the perspective of reducing the tire noise.

Providing a noise absorber made from a porous material such as sponge on an inner circumference surface of the tread portion of a pneumatic tire using an elastic fixation band has been proposed as a technique for reducing noise caused by cavernous resonance (for example, see Japan Patent No. 4281874). However, when the fixing of the noise absorber is dependent on the elastic fixation band, there is a problem in that the elastic fixing band deforms during high speed traveling.

When vulcanizing a green tire using a bladder, the bladder is prone to stick to the inner surface of the green tire. Therefore, by applying a release agent to the inner surface of the green tire, sticking between the green tire and the bladder is prevented. In such a case, when the noise absorber is directly adhered and fixed to the tire inner surface, there is a problem of poor adhesion between the noise absorber and the tire inner surface to which the release agent is attached, which results in a higher risk of the noise absorber peeling off.

In view of this, it has been proposed to apply the release agent to the inner surface of the green tire, vulcanize the green tire, and then remove the release agent by performing a buffing on the tire inner surface (for example, Japan Patent No. 4410753). However, such buffing also leads to a thinner gauge of an innerliner, resulting in compromised air retention. Furthermore, it has been proposed to adhere a film on the inner surface of the green tire in advance, apply a release agent to an inner surface of the green tire in the state where the film is adhered, and peel the film after vulcanizing the green tire to remove the release agent (for example, Japan Unexamined Patent Publication No. 2015-107690). However, the step of peeling the film after vulcanization thus required results in a longer manufacturing time which is directly related to a lower tire productivity. Furthermore, it has been proposed to clean the tire inner surface to which the release agent is attached. However, such a process cannot sufficiently remove the release agent and even results in low tire productivity.

SUMMARY

The present technology provides a pneumatic tire that can achieve both air retention and adhesion of a noise absorber without compromising tire productivity by affixing the noise absorber to the tire inner surface with the release agent adhered thereto, and a method for manufacturing the same.

A pneumatic tire according to an embodiment of the present technology is a pneumatic tire vulcanized by using a bladder provided with a coating layer formed by a release agent, the tire comprising a noise absorber fixed on an inner surface of a tread portion along a tire circumferential direction via an adhesive layer, wherein a thickness of the release agent detected by an electron microscope is 0.1 μm to 100 μm at least in a fixation region for the noise absorber.

A method for manufacturing a pneumatic tire according to an embodiment of the present technology is a method for manufacturing a pneumatic tire comprising: vulcanizing a green tire using a bladder having a coating layer formed by a release agent; and fixing a noise absorber to a fixation region for the noise absorber on an inner surface of a tread portion of the vulcanized pneumatic tire along a tire circumference direction via an adhesive layer, with a thickness of the release agent detected by an electron microscope being 0.1 μm to 100 μm at least in a fixation region for the noise absorber.

In an embodiment of the present technology, by performing vulcanization using a bladder provided with a coating layer formed by a release agent, a thickness of the release agent can be 0.1 μm to 100 μm at least in a fixation region for the noise absorber. The release agent in such a small amount attached to the tire inner surface in this manner inhibits the permeation of air from the tire inner surface so that air retention can be improved, while sufficiently ensuring the adhesion between the tire inner surface and the noise absorber. Furthermore, in an embodiment of the present technology, the tire productivity would not be compromised unlike in conventional cases where the tire inner surface is buffed, where a film is applied to the tire inner surface, or where the tire inner surface is cleaned. As a result, the air retention and the adhesion of the noise absorber can both be achieved without compromising the tire productivity.

In an embodiment of the present technology, the adhesive layer preferably has a peel adhesive strength in a range of 5 N/20 mm to 100 N/20 mm. This facilitates the processes of bonding the noise absorber and removing the member when the tire is being disposed of while maintaining satisfactory anchoring strength on the part of the noise absorber. The peel adhesive strength of the adhesive layer is measured in accordance with JIS (Japanese Industrial Standard)-Z0237. In other words, the double-sided adhesive sheet is lined by applying 25 μm thick PET (polyethylene terephthalate) film. Test pieces are prepared by cutting the lined adhesive sheet into rectangles with a size of 20 mm×200 mm. The removable liner is peeled off the test pieces, and the exposed adhesive surface is bonded to a piece of stainless steel (SUS: 304; surface finish: BA (bright annealed)) sheet, acting as a base material, using a 2-kg reciprocating roller. The resultant arrangement is kept in a 23° C. (standard state), 50% relative humidity environment for 30 minutes, after which a tensile tester is used to measure the 180° peel adhesive force of the adhesive sheet to the SUS sheet according to JIS-Z 0237 and in a 23° C., 50% relative humidity environment at testing conditions of 180° peel angle and 300 mm/min tensile test speed.

In an embodiment of the present technology, the adhesive layer is preferably formed by a double-sided adhesive tape, and has a total thickness in a range of 10 μm to 150 μm. Accordingly, it is possible to achieve a following capability of the adhesive layer with respect to deformation during the molding step.

In an embodiment of the present technology, the adhesive layer is preferably formed by a double-sided adhesive tape including an adhesive only or including an adhesive and a nonwoven fabric. In the case of double-sided adhesive tape containing only an adhesive, deterioration of high-speed durability can be suppressed and followability with respect to deformation of the tire is excellent because heat dissipation is not inhibited. In addition, in the case of a double-sided adhesive tape including an adhesive and a nonwoven fabric, high-speed durability and followability can be achieved in a compatible manner.

In an embodiment of the present technology, a center position of the noise absorber in a width direction is preferably in a range of ±10 mm from a tire equator. With the noise absorber disposed in this manner, tire uniformity would not be compromised. In particular, the noise absorber is more preferably disposed with the center portion being in a range of ±5 mm of the tire equator.

In an embodiment of the present technology, the volume of the noise absorber is preferably from 10% to 30% of the cavity volume of the tire. This makes it possible to obtain even higher sound absorbing effect of the noise absorber. By increasing the volume of the noise absorber in this manner an excellent noise reduction effect can be obtained, and moreover a good adhesive state can be maintained over a long period of time, even with a large noise absorber. Cavity volume of the tire is a volume of the cavity formed between with the tire and on a regular rim in a state where the tire is mounted on the rim and inflated to the regular internal pressure. "Regular rim" is a rim defined by a standard for each tire according to a system of standards that includes standards on which tires are based, and refers to a "standard rim" in the case of JATMA (Japan Automobile Tyre Manufacturers Association, Inc.), refers to a "design rim" in the case of TRA (The Tire and Rim Association, Inc.), and refers to a "measuring rim" in the case of ETRTO (European Tyre and Rim Technical Organisation). However, when the tire is an original equipment tire, the volume of the space is calculated using a genuine wheel to which the tire is assembled. "Regular internal pressure" is an air pressure defined by standards for each tire according to a system of standards that includes standards on which tires are based, and refers to a "maximum air pressure" in the case of JATMA, refers to the maximum value in the table of "TIRE LOAD LIMITS AT VARIOUS COLD INFLATION PRESSURES" in the case of TRA, and refers to the "INFLATION PRESSURE" in the case of ETRTO. However, the air pressure which is displayed on the vehicle is used in a case where the tire is an original equipment tire.

A hardness of the noise absorber is preferably from 80 N to 150 N, both inclusive, and a tensile strength of the noise absorber is preferably equal to or larger than 90 kPa, and a breaking elongation of the noise absorber is preferably equal to or larger than 200%. A noise absorber with these physical properties has excellent durability against expansion of the tire during inflation and/or shear strain of the adhesive surface due to rolling on ground. The hardness of the noise absorber, the tensile strength of the noise absorber, and the breaking elongation of the noise absorber are measured in accordance with JIS-K6400.

In an embodiment of the present technology, the noise absorber preferably has a missing portion in at least one position in the tire circumferential direction. With such a configuration, expansion of the tire during inflation and/or shearing strain of the adhesive surface due to rolling on ground can be tolerated for a long period of time.

In an embodiment of the present technology, the coating layer is preferably formed on the bladder with a coating time t (hour) and a temperature T (° C.) of the coating layer satisfying t≥−0.0571 T+9.14 and 10° C.≤T≤180° C. Thus, the time for coating the release agent in a bladder provided with the coating layer can be reduced, without shortening the bladder life.

DETAILED DESCRIPTION

Figure 1:
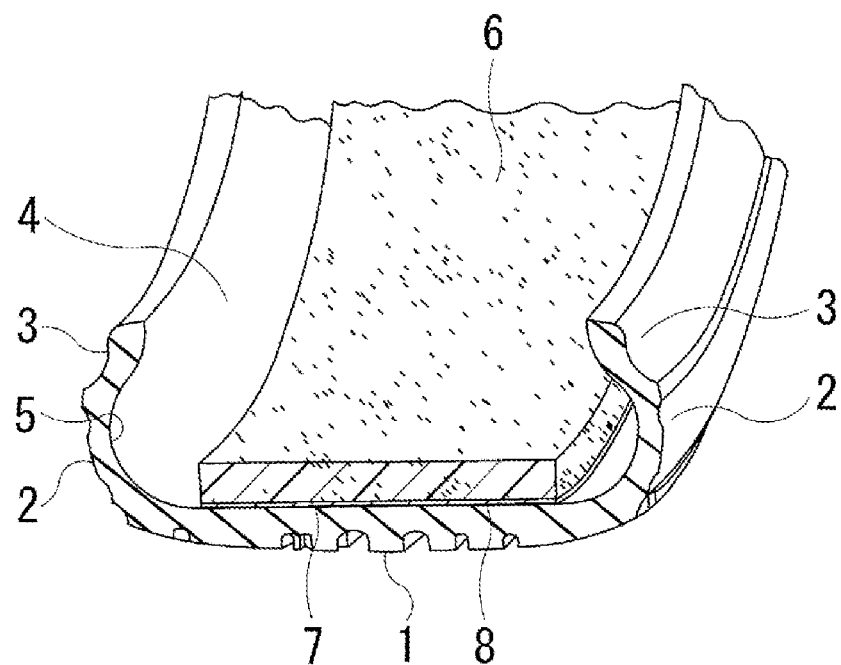
FIG. 1 is a perspective cross-sectional view of a pneumatic tire according to an embodiment of the present technology.
Figure 2:
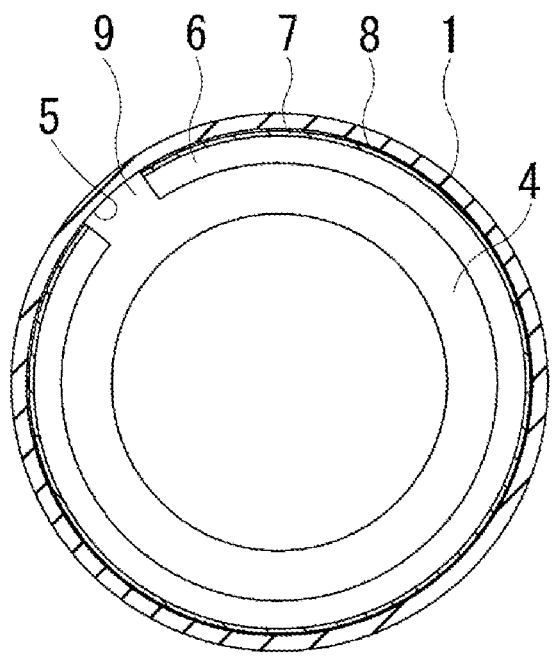
FIG. 2 is a cross-sectional view taken along the equator line of the pneumatic tire according to the embodiment of the present technology.
Figure 3:
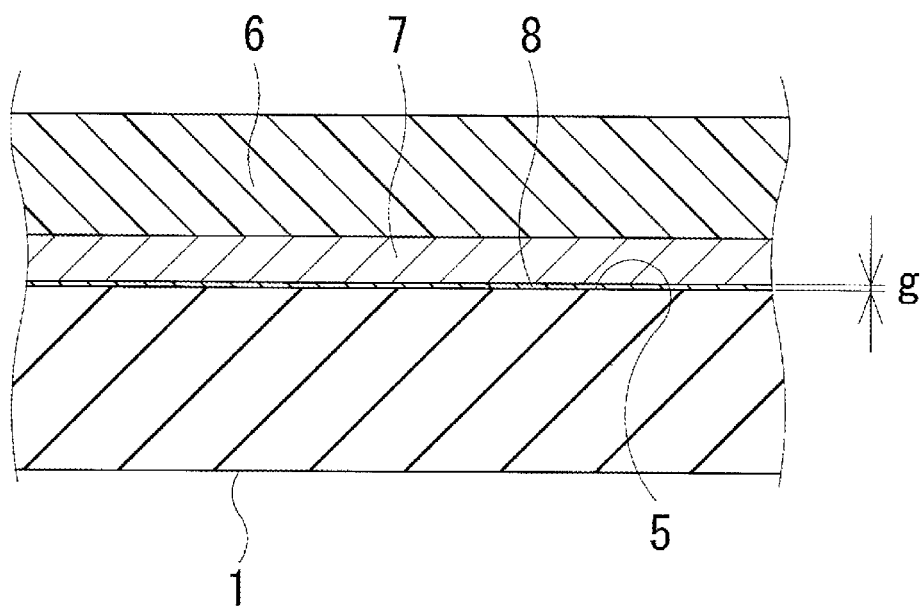
FIG. 3 is a cross-sectional view illustrating an enlarged portion of a part of the pneumatic tire according to an embodiment of the present technology.

Configurations of embodiments of the present technology are described in detail below with reference to the accompanying drawings. FIGS. 1 to 3 illustrate a pneumatic tire according to an embodiment of the present technology. As illustrated in FIG. 1, the pneumatic tire according to the present embodiment includes an annular tread portion 1 extending in the tire circumferential direction, a pair of sidewall portions 2 disposed on both sides of the tread portion 1, and a pair of bead portions 3 disposed inward of the sidewall portions 2 in the tire radial direction. A ring-shaped noise absorber 6 illustrated in FIG. 2 is mounted in the cavity 4 defined by the tread portion 1, the sidewall portion 2, and the bead portion 3. This noise absorber 6 is disposed in a region of the tire inner surface 5 corresponding to the tread portion 1.

A noise absorber 6 is bonded along the tire circumferential direction to a region of the tire inner surface 5 corresponding to the tread portion 1, via an adhesive layer 7. The noise absorber 6 is made of a porous material with open cells, and has predetermined noise absorbing properties based on the porous structure. Polyurethane foam is preferably used as the porous material of the noise absorber 6. The adhesive layer 7 is not particularly limited, and for example, an adhesive or double-sided adhesive tape can be used.

In the pneumatic tire described above, as illustrated in FIG. 3, a transfer layer 8 formed by a release agent is present between the tire inner surface 5 and the adhesive layer 7. In other words, the noise absorber 6, the adhesive layer 7, and the transfer layer 8 of the release agent are layered in this order from the inner side in the tire radial direction. The green tire is vulcanized using a bladder provided with a coating layer made of a release agent, whereby the transfer layer 8 is transferred on the tire inner surface 5 of the vulcanized pneumatic tire. The release agent transferred in this manner is not entirely transferred but is dispersed on the tire inner surface 5.

The thickness g of the transfer layer 8 formed of the release agent illustrated in FIG. 3 is 0.1 μm to 100 μm at least in the fixation region for the noise absorber 6 of the tire inner surface 5. The thickness g of this transfer layer 8 formed by the release agent can be detected using an electron microscope. When measuring the thickness g of the transfer layer 8 formed by the release agent using an electron microscope, the thickness of a plurality of locations (for example, four locations in the tire circumferential direction and three locations in the tire lateral direction) is measured using a sample obtained by cutting out the pneumatic tire along the tire lateral direction. Then, the thickness g (average thickness) of the transfer layer 8 of the mold release agent is calculated by averaging the measurement values measured at the plurality of locations.

Examples of components that can be compounded in the transfer layer 8 formed by the release agent include those containing a silicone component as an active ingredient. Examples of the silicone component include organopolysiloxanes, such as, for example, dialkylpolysiloxane, alkyl phenyl polysiloxane, alkyl aralkyl polysiloxane, 3,3,3-trifluoropropylmethylpolysiloxane, and the like. The dialkylpolysiloxane is, for example, dimethylpolysiloxane, diethylpolysiloxane, methyl isopropyl polysiloxane, and methyl dodecyl polysiloxane. Examples of the alkyl phenyl polysiloxane include a methylphenylpolysiloxane, a dimethylsiloxane-methylphenylsiloxane copolymer, and a dimethylsiloxane-diphenylsiloxane copolymer. Examples of the alkyl aralkyl polysiloxane include methyl (phenylethyl) polysiloxane, and methyl (phenylpropyl) polysiloxane. One type or two or more types of these organopolysiloxanes may be used in combination.

By performing vulcanization using a bladder provided with a coating layer formed by a release agent as described above, a thickness of the release agent transferred can be 0.1 μm to 100 μm at least in a fixation region for the noise absorber 6. The release agent in such a small amount attached to the tire inner surface 5 in this manner inhibits the permeation of air from the tire inner surface 5 so that air retention can be improved, while sufficiently ensuring the adhesion between the tire inner surface 5 and the noise absorber 6. Here, if the thickness of the release agent transferred on the fixation region for the noise absorber 6 is less than 0.1 μm, improvement in air retention cannot be achieved, and when the thickness is greater than 100 μm, the adhesion of the noise absorber 6 will be compromised resulting in a failure to achieve sufficient durability.

Furthermore, the tire productivity would not be compromised unlike in conventional cases where the tire inner surface is buffed, where a film is applied to the tire inner surface, or where the tire inner surface is cleaned. As a result, the air retention and the adhesion of the noise absorber 6 can both be achieved without compromising the tire productivity. On the other hand, removal of the release agent adhered to the tire inner surface with the conventional method described above involves additional working time in each step. As a result, tire productivity is lower than that in a case where the noise absorber is fixed in a state in which the release agent is adhered as in the present technology.

In the pneumatic tire described above, the peeling adhesive strength of the adhesive layer 7 is preferably from 5 N/20 mm to 100 N/20 mm. With the peeling adhesive strength of the adhesive layer 7 thus appropriately set, the fixing strength of the noise absorber 6 is suitably maintained and also application of the noise absorber 6 and removal of the noise absorber 6 upon tire disposal can be easily performed. Examples of the adhesive that forms the adhesive layer 7 include acrylic-adhesives, rubber-based adhesives, and silicone-based adhesives, and the adhesive layer 7 is preferably formed from any of these adhesives. Silicone adhesives are particularly preferable because the adhesion using such adhesives is free of temperature dependency meaning that excellent adhesion with the noise absorber 6 can be achieved even when the release agent is remaining. Acrylic adhesives have excellent heat resistance and are therefore suitable in high speed regions.

The adhesive layer 7 is formed by double-sided adhesive tape, and the adhesive layer 7 is preferably configured to have a total thickness in a range from 10 μm to 150 μm. The adhesive layer 7 having such a configuration ensures followability with respect to deformation during molding. The adhesive layer 7 with a total thickness that is less than 10 μm results in a failure to ensure sufficient adhesion to the noise absorber 6 due to insufficient strength of the double-sided adhesive tape. The adhesive layer 7 with a total thickness exceeding 150 μm inhibits heat dissipation during high speed traveling and thus is likely to result in deterioration of high-speed durability.

The adhesive layer 7 is preferably a double-sided adhesive tape including only an adhesive or a double-sided adhesive tape including an adhesive and a nonwoven fabric. The double-sided adhesive tape including only an adhesive (a double-sided adhesive tape without a base member serving as a support that supports the adhesive) will not hinder heat dissipation so that the deterioration of high-speed durability can be suppressed and also features excellent followability with respect to deformation of the tire. The double-sided adhesive tape including an adhesive and a nonwoven fabric (a double-sided adhesive tape having a nonwoven fabric serving as the base member) can achieve both high-speed durability and followability. Here, when the base member is formed from a rigid material such as polyethylene terephthalate (PET), peeling is more likely to occur between the base material and the adhesive or the tire and the adhesive due to deformation of the tire, leading to the dropping of the noise absorber 6. In addition, if the strength at break and the breaking elongation of the base member are low, the base member itself may be damaged. A base member formed from acrylic foam has a large thickness which is likely to lead to deterioration of the high-speed durability.

In the pneumatic tire described above, the hardness of the noise absorber 6 is preferably 80 N to 150 N, the tensile strength of the noise absorber 6 is preferably not less than 90 kPa, and the breaking elongation of the noise absorber 6 is preferably 200% or greater. The noise absorber 6 with such physical properties has superior durability against expansion of the tire during inflation and/or shear strain of the adhesive surface due to rolling on ground. Here, the noise absorber 6 with the hardness that is less than 80 N is likely to be compressed and deformed by centrifugal force during traveling. The noise absorber 6 with the hardness exceeding 150 N cannot follow the deformation of the tire during traveling and thus might break.

The center position of the noise absorber 6 in the width direction is preferably in a range of ±10 mm from the tire equator, and more preferably being in a range of ±5 mm from the tire equator. With the noise absorber 6 disposed in this manner, tire uniformity would not be compromised.

The volume of the noise absorber 6 is preferably in a range from 10% to 30% of the cavity volume of the tire. The width of the noise absorber 6 is more preferably in the range from 30% to 90% of the tire ground contact width. This makes it possible to obtain even higher sound absorbing effect of the noise absorber 6. The noise absorber 6 with a volume that is less than 10% of the cavity volume of the tire fails to appropriately provide the sound absorbing effect. The noise absorber 6 with a volume exceeding 30% of the inner cavity volume of the tire can only achieve a constant noise reduction effect against the noise due to the cavernous resonance, meaning that higher reduction effect cannot be obtained.

As illustrated in FIG. 2, the noise absorber 6 preferably has a missing portion 9 in at least one position in the tire circumferential direction. The missing portion 9 is a portion where the noise absorber 6 is not present on the tire circumference. With the missing portion 9 provided in the noise absorber 6, expansion of the tire during inflation and/or shearing strain of the adhesion surface due to rolling on ground can be tolerated for a long period of time, and the shearing strain on the adhesion surface of the noise absorber 6 can be effectively relaxed. Such a missing portion 9 may be provided at one location or at three to five locations on the tire circumference. That is, when the missing portions 9 are provided at two positions on the tire circumference, tire uniformity due to mass unbalance significantly deteriorates, and when the missing positions 9 are provided at six or more positions on the circumference, production cost significantly increases.

Note that in cases where the missing portion 9 is provided at two or more locations on the tire circumference, the noise absorbers 6 are intermittently provided in the tire circumferential direction. However, even in such cases, for example, the plurality of noise absorbers 6 may be connected to each other using other laminates such as the adhesive layer 7 formed by double-sided adhesive tape, so that the noise absorbers 6 can be handled as an integral member to be easily attached to the tire inner surface 5.

Next, a method of manufacturing the pneumatic tire according to an embodiment of the present technology will be described. When vulcanizing a green tire, a release agent is coated (preferably baked) on the bladder in advance to form a coating layer formed by the release agent on the outer surface of the bladder. The step of forming the coating layer on the outer surface of the bladder is implemented, for example, under storage, after the coating of the release agent, with a condition of an hour at 150° C., four hours at 90° C., or eight hours at ambient temperature. Furthermore, the step of forming the coating layer on the outer surface of the bladder is performed once, twice, or three times. The green tire is vulcanized using the bladder with the coating layer thus formed. Then, in the vulcanized tire, the noise absorber 6 is fixed to the fixation region for the noise absorber 6 on the tire inner surface 5 of the tread portion 1 along the tire circumferential direction via the adhesive layer 7.

By performing vulcanization using a bladder provided with a coating layer formed by a release agent as described above, a thickness of the release agent transferred can be 0.1 μm to 100 μm at least in a fixation region for the noise absorber 6. The release agent in such a small amount attached to the tire inner surface 5 in this manner inhibits the permeation of air from the tire inner surface 5 so that air retention can be improved, while sufficiently ensuring the adhesion between the tire inner surface 5 and the noise absorber 6. Furthermore, the tire productivity would not be compromised unlike in conventional cases where the tire inner surface is buffed, where a film is applied to the tire inner surface, or where the tire inner surface is cleaned. As a result, the air retention and the adhesion of the noise absorber 6 can both be achieved without compromising the tire productivity.

In particular, the coating layer is preferably formed on the outer surface of the bladder with a coating time t (hour) and a temperature T (° C.) of the coating layer satisfying t≥−0.0571 T+9.14 and 10° C.≤T≤180° C. Furthermore, it is more preferable to set the temperature T to 90° C. and to set the coating time t to 4 hours, and it is even more preferable to set the temperature T to 150° C. and to set the coating time t to 1 hour. By satisfying these conditions, the time for coating the release agent in a bladder provided with the coating layer can be reduced, without shortening the bladder life. Here, higher temperatures T (° C.) allow the coating layer to be formed in a shorter period of time, but may cause deterioration of the bladder resulting in a shorter bladder life.

EXAMPLES

Tires according to Comparative Examples 1 to 5 and Examples 1 to 3 were manufactured based on a pneumatic tire having a tire size of 275/35ZR20, and having a noise absorber fixed to the inner surface of a tread portion via the adhesive layer, along the tire circumferential direction. A method of removing the release agent, the coating of the tire inner surface by the release agent, use of a bladder provided with a coating layer formed by the release agent at the time of vulcanization, and the thickness (μm) of the release agent on the tire inner surface are set as in Table 1.

In Comparative Example 1, the release agent was coated on the tire inner surface, and the release agent was not removed. In Comparative Examples 2 to 4, the release agent was applied to the tire inner surface, and the release agent was removed after the completion of the vulcanization step. Specifically, the release agent on the tire inner surface was removed by buffing in Comparative Example 2, by peeling off the film adhered to the tire inner surface in Comparative Example 3, and by washing the tire inner surface in Comparative Example 4.

Note that in Table 1, the thickness (μm) of the release agent on the tire inner surface was determined by measuring the thickness of the mold release agent at four locations in the tire circumferential direction and three locations in the tire lateral direction of each of the test tires after the fabrication step was completed, and by averaging the resultant measurement values.

Adhesion of the noise absorber, air retention, and tire productivity were evaluated for these test tires according to the following test methods. Table 1 also shows the result of the evaluation.

Adhesion of Noise Absorber:

The adhesion of the noise absorber referred to here is an evaluation of the peeling of the adhesive surface between the tire inner surface and the noise absorber. The test tires were assembled on wheels having a rim size of 20×9.5 J, and subjected to a running test on a drum testing machine at testing conditions of speed of 80 km/h, air pressure of 160 kPa, load of 8.5 kN, and traveling distance of 6,480 km, after which whether the noise absorber has dropped or peeled was visually confirmed. Here, "Excellent" indicates a case where there is no dropping or peeling of the noise absorber, "Good" indicates a case where the peeling of the noise absorber was less than ⅛ of the entire noise absorber; "Fair" indicates a case where the peeling of the noise absorber was no less than ⅛ or no greater than ¼ of the entire noise absorber, and "Poor" indicates a case where the noise absorber peeling was no less than ¼ of the entire noise absorber.

Air Retention:

Each of the test tires was assembled on wheels having a rim size of 20×9.5J, left for 24 hours under conditions of an air pressure of 270 kPa and a temperature of 21° C., and then the air pressure was measured for 42 days with the initial air pressure set to 250 kPa to obtain the inclination of the air leakage rate in a period between the day 15 to the day 42. The evaluation results are expressed as index values using the reciprocal of the measurement values, with the value of Comparative Example 1 being defined as 100. Larger index values indicate superior air retention. Note that the conventional level of air retention is maintained as long as the index value is equal to or greater than 98.

Tire Productivity:

For each test tire, the fabrication time (minutes) required to fabricate one tire was measured. The evaluation results are expressed as index values using the reciprocal of the measurement values, with the value of Comparative Example 1 being defined as 100. Larger index values indicate superior tire productivity.

TABLE 1

|  | Comparative Example 1 | Comparative Example 2 | Comparative Example 3 | Comparative Example 4 |
|---|---|---|---|---|
| Removal method of mold release agent | — | Buffing | Film peeling | Cleaning |
| Application of release agent to tire inner surface | Yes | Yes | Yes | Yes |
| Use of a bladder provided with a coating layer formed by a release agent in vulcanization | No | No | No | No |
| Thickness of release agent on tire inner surface (μm) | 300 | 0 | 0 | 150 |
| Adhesion of Noise absorber: | Poor | Excellent | Excellent | Fair |
| Air Retention | 100 | 89 | 96 | 100 |
| Tire productivity | 100 | 95 | 95 | 95 |

|  | Example 1 | Example 2 | Example 3 | Comparative Example 5 |
|---|---|---|---|---|
| Removal method of mold release agent | — | — | — | — |
| Application of release agent to tire inner surface | No | No | No | No |
| Use of a bladder provided with a coating layer formed by a release agent in vulcanization | Yes | Yes | Yes | Yes |
| Thickness of release agent on tire inner surface (μm) | 0.1 | 10 | 100 | 110 |
| Adhesion of Noise absorber: | Excellent | Excellent | Good | Fair |
| Air Retention | 98 | 99 | 100 | 100 |
| Tire productivity | 100 | 100 | 100 | 100 |

As can be seen from Table 1, compared to Comparative Example 1, the pneumatic tires of Examples 1 to 3 have improved adhesion of the noise absorber while maintaining air retention and without compromising the tire productivity.

On the other hand, in Comparative Example 2 where the tire inner surface was buffed, the tire productivity was compromised, and the air retention was also compromised due to the reduction of the gauge of the innerliner. In Comparative Example 3, the film was adhered to the tire inner surface and the film was peeled off after vulcanization, resulting in deterioration of tire productivity. In Comparative Example 4, although the tire inner surface was cleaned, the release agent on the tire inner surface was not completely removed. In fact, there was a relatively large amount of release agent on the tire inner surface, resulting in lower adhesion of the noise absorber. In Comparative Example 5, the thickness of the release agent on the tire inner surface was set to be large, resulting in insufficient improvement effect for the adhesion of the noise absorber.

The invention claimed is:

1. A pneumatic tire comprising a noise absorber fixed on an inner surface of a tread portion along a tire circumferential direction via an adhesive layer, and a release agent between the adhesive layer and the tread portion having a thickness as detected by an electron microscope of 0.1 μm to 100 μm at least in a fixation region for the noise absorber; wherein the adhesive layer is in contact with the release agent, the release agent consists only of one or more selected from the group consisting of a dialkylpolysiloxane, an alkyl aralkyl polysiloxane, a 3,3,3-trifluoropropylmethylpolysiloxane, or combinations thereof, a hardness of the noise absorber is greater than 80 N and less than or equal to 150 N, a tensile strength of the noise absorber is equal to or greater than 90 kPa, and a breaking elongation of the noise absorber is equal to or greater than 200%, and the adhesive layer is formed by a double-sided adhesive tape, and has a total thickness in a range of 10 μm to 150 μm.

2. The pneumatic tire according to claim 1, wherein the adhesive layer has a peel adhesive strength in a range of 5 N/20 mm to 100 N/20 mm.

3. The pneumatic tire according to claim 1, wherein the adhesive layer is formed by the double-sided adhesive tape including an adhesive only or including an adhesive and a nonwoven fabric.

4. The pneumatic tire according to claim 1, wherein a center position of the noise absorber in a width direction is in a range of +10 mm from a tire equator.

5. The pneumatic tire according to claim 1, wherein a volume of the noise absorber is from 10% to 30% relative to a cavity volume of the tire.

6. The pneumatic tire according to claim 1, wherein the noise absorber has a missing portion in at least one position in the tire circumferential direction.

7. The pneumatic tire according to claim 1, wherein the thickness of the release agent is from 0.1 μm to 0.95 μm at least in the fixation region for the noise absorber.

8. The pneumatic tire according to claim 1, wherein the total thickness of the adhesive layer is in a range of 10 μm to 95 μm.

9. The pneumatic tire according to claim 1, wherein a volume of the noise absorber is from 21% to 30% relative to a cavity volume of the tire.

10. A method for manufacturing a pneumatic tire, the method comprising: vulcanizing a green tire using a bladder having a coating layer formed by a release agent; and fixing a noise absorber to a fixation region for the noise absorber on an inner surface of a tread portion of the vulcanized pneumatic tire along a tire circumference direction via an adhesive layer, with a thickness of the release agent between the adhesive layer and the tread portion of the vulcanized pneumatic tire as detected by an electron microscope being 0.1 μm to 100 μm at least in the fixation region for the noise absorber; wherein the adhesive layer is in contact with the release agent, the release agent consists only of one or more selected from the group consisting of a dialkylpolysiloxane, an alkyl aralkyl polysiloxane, a 3,3,3-trifluoropropylmethylpolysiloxane, or combinations thereof, a hardness of the noise absorber is greater than 80 N and less than or equal to 150 N, a tensile strength of the noise absorber is equal to or greater than 90 kPa, and a breaking elongation of the noise absorber is equal to or greater than 200%, the adhesive layer is formed by a double-sided adhesive tape and has a total thickness in a range of 10 μm to 150 μm.

11. The method for manufacturing a pneumatic tire according to claim 10, wherein the adhesive layer has a peel adhesive strength in a range of 5 N/20 mm to 100 N/20 mm.

12. The method for manufacturing a pneumatic tire according to claim 10, wherein the adhesive layer is formed by the double-sided adhesive tape including an adhesive only or including an adhesive and a nonwoven fabric.

13. The method for manufacturing a pneumatic tire according to claim 10, wherein a center position of the noise absorber in a width direction is in a range of ±10 mm from a tire equator.

14. The method for manufacturing a pneumatic tire according to claim 10, wherein a volume of the noise absorber is from 10% to 30% relative to a cavity volume of the tire.

15. The method for manufacturing a pneumatic tire according to claim 10, wherein the noise absorber has a missing portion in at least one position in the tire circumferential direction.

16. The method for manufacturing a pneumatic tire according to claim 10, wherein the coating layer is formed on the bladder with a coating time t (hour) and a temperature T (° C.) of the coating layer satisfying $t \geq -0.0571 T + 9.14$ and $10° C. \leq T \leq 180° C.$ 17. The method for manufacturing a pneumatic tire according to claim 10, wherein the thickness of the release agent is from 0.1 μm to 0.95 μm at least in the fixation region for the noise absorber.

18. The method for manufacturing a pneumatic tire according to claim 10, wherein the total thickness of the adhesive layer is in a range of 10 μm to 95 μm.

19. The method for manufacturing a pneumatic tire according to claim 10, wherein a volume of the noise absorber is from 21% to 30% relative to a cavity volume of the tire.

* * * * *